(12) United States Patent
Majima

(10) Patent No.: US 8,023,585 B2
(45) Date of Patent: Sep. 20, 2011

(54) APPARATUS AND METHOD FOR TRANSMITTING OR RECEIVING DATA

(75) Inventor: Taichi Majima, Yokohama (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 790 days.

(21) Appl. No.: 10/582,615

(22) PCT Filed: Dec. 22, 2004

(86) PCT No.: PCT/JP2004/019721
§ 371 (c)(1),
(2), (4) Date: Jun. 12, 2006

(87) PCT Pub. No.: WO2005/064838
PCT Pub. Date: Jul. 14, 2005

(65) Prior Publication Data
US 2007/0160163 A1   Jul. 12, 2007

(30) Foreign Application Priority Data
Dec. 26, 2003   (JP) .................................. 2003-435638

(51) Int. Cl.
*H04L 27/00* (2006.01)
(52) U.S. Cl. ........ 375/295; 375/316; 375/358; 375/354; 714/701; 714/800; 714/746; 714/776; 714/799; 714/801
(58) Field of Classification Search .................. 375/295, 375/316, 358, 354; 714/701, 800, 746, 776, 714/799, 801; 371/32–35, 43
See application file for complete search history.

(56) References Cited

U.S. PATENT DOCUMENTS

| 4,047,151 A | 9/1977 | Rydbeck et al. |
| 4,277,778 A | 7/1981 | Persson |

(Continued)

FOREIGN PATENT DOCUMENTS

| CA | 2300852 | 3/1999 |

(Continued)

OTHER PUBLICATIONS

European Search Report (Application Serial No. 04808071.7) dated Jan. 30, 2008.

(Continued)

*Primary Examiner* — David C. Payne
*Assistant Examiner* — Zewdu Kassa
(74) *Attorney, Agent, or Firm* — Eric J. Robinson; Robinson Intellectual Property Law Office, P.C.

(57) ABSTRACT

A bit adding part acquires RSSI as measured by an RSSI measuring part, and adds "1" to each bit of protected audio data of an audio vocoder, if the acquired RSSI is smaller than a predetermined threshold value. If the acquired RSSI is equal to or greater than the predetermined threshold value, the bit adding part adds the bits of additional data to the respective bits of the protected data of the audio vocoder. A frame recovery part separates upper and lower order bits of deinterleaved data, and determines, based on CRC, whether eight data parts as obtained by combining the lower order bits as separated are valid. If so, the frame recovery part combines the eight data parts as the additional data to recovery additional information. In this way, additional data can be efficiently transmitted, while error correction being performed in accordance with communication environment.

10 Claims, 11 Drawing Sheets

U.S. PATENT DOCUMENTS

| | | | |
|---|---|---|---|
| 4,534,040 A | | 8/1985 | Thapar |
| 4,616,702 A | | 10/1986 | Hanson et al. |
| 4,888,799 A | | 12/1989 | Mobley |
| 4,901,072 A | * | 2/1990 | Fox .................................. 341/10 |
| 4,984,191 A | | 1/1991 | Vermesse |
| 5,214,656 A | | 5/1993 | Chung et al. |
| 5,457,705 A | * | 10/1995 | Todoroki ...................... 714/795 |
| 5,473,612 A | | 12/1995 | Dehner, Jr. et al. |
| 5,566,213 A | | 10/1996 | Carsello |
| 5,677,681 A | | 10/1997 | Tanaka et al. |
| 5,818,875 A | * | 10/1998 | Suzuki et al. ................. 375/261 |
| 5,828,672 A | | 10/1998 | Labonte et al. |
| 5,835,508 A | * | 11/1998 | Kushita ......................... 714/748 |
| 6,125,148 A | | 9/2000 | Frodigh et al. |
| 6,232,906 B1 | | 5/2001 | Tada |
| 6,311,306 B1 | | 10/2001 | White et al. |
| 6,512,748 B1 | | 1/2003 | Mizuki et al. |
| 2002/0040460 A1 | * | 4/2002 | Choi et al. .................... 714/755 |
| 2003/0039229 A1 | | 2/2003 | Ostman |
| 2003/0167425 A1 | * | 9/2003 | Bader et al. ................... 714/100 |
| 2003/0206602 A1 | | 11/2003 | Yamamoto |
| 2005/0047323 A1 | | 3/2005 | Clarkson et al. |
| 2007/0136637 A1 | | 6/2007 | Majima |
| 2009/0193309 A1 | | 7/2009 | Majima |
| 2009/0202065 A1 | | 8/2009 | Majima |
| 2009/0202066 A1 | | 8/2009 | Majima |

FOREIGN PATENT DOCUMENTS

| | | |
|---|---|---|
| CN | 1278379 | 12/2000 |
| EP | 0 727 891 | 8/1996 |
| EP | 1 388 965 | 2/2004 |
| EP | 1 732 258 | 12/2006 |
| JP | 2003-174485 | 7/1981 |
| JP | 63-172535 | 7/1988 |
| JP | 63-174445 | 7/1988 |
| JP | 11-220762 | 8/1999 |
| JP | 2001-515301 | 9/2001 |
| JP | 2003-143243 | 5/2003 |
| JP | 2003-158502 | 5/2003 |
| JP | 2003-338852 | 11/2003 |
| JP | 2004/200972 | 7/2004 |
| WO | WO 97/33402 | 9/1997 |
| WO | WO 99/12283 | 3/1999 |
| WO | WO 01/26236 | 4/2001 |
| WO | WO 02/069546 | 9/2002 |
| WO | WO 03-049392 | 6/2003 |
| WO | WO 03/063465 | 7/2003 |

OTHER PUBLICATIONS

International Search Report for PCT/JP2004/019721.
Written Notification of Reason for Refusal (Application No. JP 2003-435638) Dated Apr. 1, 2008.
Masakazu Morimoto et al., "A Study on a Hierarchical Image Transmission System in a Rayleigh Fading Channel" Department of Communications Engineering, Faculty of Engineering, Oasaka University, Institute of Electronics, Information Communication Engineers (IEICE), vol. 96, No. 49, May 21, 1996, pp. 33-38.
International Preliminary Examination Report of Aug. 31, 2006 for PCT/JP2004/019721.
Office Action (U.S. Appl. No. 11/663,552) dated Dec. 16, 2009.
Office Action (U.S. Appl. No. 11/663,552) dated Jun. 10, 2010.
Office Action (U.S. Appl. No. 11/663,552) dated Oct. 20, 2010.
Office Action (U.S. Appl. No. 11/663,552) dated Feb. 28, 2011.
Written Notification of Reason for Refusal (Application No. JP 2003-409688) dated Jul. 8, 2008.
Supplementary European Search Report (Application No. 04801628.8) dated Dec. 16, 2008.
Office Action (U.S. Appl. No. 10/581,667) dated Sep. 1, 2009.
Office Action (U.S. Appl. No. 10/581,667) dated Mar. 10, 2010.
Office Action (U.S. Appl. No. 10/581,667) dated Sep. 10, 2010.
Office Action (U.S. Appl. No. 10/581,667) dated Mar. 14, 2011.
European Search Report (Application No. 09005333.1) dated Jun. 19, 2009.
Office Action (U.S. Appl. No. 12/419,559) dated Mar. 12, 2010.
Office Action (U.S. Appl. No. 12/419,559) dated Sep. 14, 2010.
Office Action (U.S. Appl. No. 12/419,559) dated Mar. 18, 2011.
Office Action (U.S. Appl. No. 12/420,313) dated Jul. 30, 2010.
Office Action (U.S. Appl. No. 12/420,313) dated Dec. 2, 2010.
International Search Report (Application No. PCT/JP 2005/018492) dated Jan. 24, 2006.
Notification of Translation of International Preliminary Report on Patentability (Application No. PCT/JP 2005/018492) dated Jun. 28, 2007.
Office Action (JP 2004-287157) dated Apr. 6, 2010.
JP 05-284147 Machine Translation.
Harris, et al., "The ABCs of Linear Block Codes," IEEE Signal Processing Magazine, Jul. 2004, pp. 14-35.
Parker, "Computer Crime: Criminal Justice Resource Manual," U.S. Department of Justice, Office of Justice Programs, Aug. 1989, pp. 1-223.
Notification of Transmittal of the International Preliminary Report (Application No. PCT/JP2004/018536) dated Aug. 31, 2006.

* cited by examiner

APPARATUS AND METHOD FOR TRANSMITTING OR RECEIVING DATA

TECHNICAL FIELD

The present invention relates to a transmitting apparatus, a receiving apparatus, a data transmitting method, and a data receiving method in a radio communication system.

BACKGROUND ART

In radio communication including mobile communication, data other than audio data such as information for specifying a communication position may be transmitted during communication.

There is also a cellular phone system described in, for example, Japanese Patent Application Laid-Open No. Hei 10-215328 (pages 3 to 6 and FIG. 2) that is adapted to transmit additional information for expansion of services such as guidance data concerning telephone numbers, location information of an originator, and a profile of the originator. This additional information is unitized and transmitted as additional data. Assuming that the audio data is main data, the additional data are associated data associated with the main data and transmitted separately at timing different from timing for transmitting the audio data.

However, the additional data are data for expansion of services as described above and are not always necessary. When the timing different from the timing for transmitting the audio data is separately provided to transmit such additional data, transmission efficiency is deteriorated. Thus, this is not preferable.

As a communication apparatus, there is a communication apparatus that controls presence or absence of FEC (Forward Error Correction) according to communication procedure data by handshake, converts a rate including FEC of main data, and transmits data using a surplus of the rate. However, in such a communication apparatus, a communication procedure (protocol) is required and the procedure is complicated.

The invention has been devised in view of such problems in the past and it is an object of the invention to provide a transmitting apparatus, a receiving apparatus, a data transmitting method, and a data receiving method that are capable of efficiently performing transmission and reception of associated data associated with main data.

It is another object of the invention to provide a transmitting apparatus, a receiving apparatus, a data transmitting method, and a data receiving method that are capable of easily controlling presence or absence of error correction.

DISCLOSURE OF THE INVENTION

In order to attain the object of the invention, a transmitting apparatus according to a first aspect of the invention basically includes a bit adding part that adds predetermined bits to bits of main data according to quality of an environment of a communication path to produce hybrid bit data; and a modulating part that performs modulation on the basis of the hybrid bit data produced to produce a modulated wave signal and transmits the modulated wave signal. The bit adding part operates to decide quality of an environment of a communication path, add, when it is decided that the environment of the communication path is defective, redundant bits to respective bits of main data to produce the hybrid bit data, and add, when it is decided that the environment of the communication path is non-defective, respective bits of associated data associated with the main data to the respective bits of the main data instead of the redundant bits to produce the hybrid bit data.

More specifically, the bit adding part operates to arrange symbols of the hybrid bit data added with the redundant bits such that a Euclidian distance of the hybrid bit data is extended.

Preferably, the bit adding part operates to add the redundant bits to the respective bits of the main data such that a gray code is produced.

The transmitting apparatus of the invention further includes a received signal strength indicator measuring part that measures a received signal strength indicator of a data transmission destination. The bit adding part is adapted to operate to acquire the received signal strength indicator from the received signal strength indicator measuring part and decide quality of an environment of the communication path on the basis of a level of the received signal strength indicator acquired.

Preferably, the bit adding part operates to acquire at least one piece of information among the received signal strength indicator measured by a data transmission destination, a vector error of a demodulated wave, and a bit error and decide quality of an environment of the communication path on the basis of the information acquired.

The modulating part may perform modulation in accordance with a multi-value FSK system.

A receiving apparatus according to a second aspect of the invention is a receiving apparatus that functions to receive a signal produced on the basis of data obtained by adding predetermined bits to respective bit data of main data. The receiving apparatus includes a demodulating part that demodulates the signal received; a symbol deciding part that applies, at every Nyquist interval, symbol decision to the signal demodulated by the demodulating part to produce a symbol value; a bit converting part that converts the symbol value produced by the symbol deciding part into a bit value; and a data recoverying part that combines respective bits of the main data to recovery original main data from the bit value converted by the bit converting part, combines bit data added to the respective bit data of the main data to form combined data, decides validity of the combined data formed, recoverys data decided as valid as additional data, deletes the added bits when it is decided that the combined data is invalid, and combines the bit data from which the added bits are deleted to recovery original data.

Preferably, the data recoverying part operates to decide validity of the combined data formed by combining the added bit data in accordance with a cyclic redundancy check.

A data transmitting method according to a third aspect of the invention basically includes a step of deciding quality of an environment of a communication path; a step of adding, when it is decided that the environment of the communication path is defective, redundant bits to respective bits of main data to produce hybrid bit data, and adding, when it is decided that the environment of the communication path is non-defective, respective bits of associated data associated with the main data to the respective bits of the main data instead of the redundant bits to produce the hybrid bit data; and a step of producing a modulated wave signal on the basis of the hybrid bit data produced to transmit the modulated wave signal.

A data receiving method according to a fourth aspect of the invention is a receiving method of receiving a signal produced on the basis of hybrid bit data obtained by adding predetermined bits to respective bits of main data. The data receiving method includes a step of demodulating the signal received; a step of applying, at every Nyquist interval, symbol decision to the signal demodulated; a step of converting the symbol value obtained by performing the symbol decision into a bit value; a step of combining respective bit data of the main data to recovery original main data from data of the bit value converted in the bit converting step; and a step of combining bits added to the respective bits of the main data to form combined data from data of the bit value converted by the bit converting part to form combined data, deciding validity of the combined data formed, recoverying data decided as valid as additional data, deleting the added bits when it is decided that the combined data is invalid, and combining the bit data from which the added bits are deleted to recovery original data.

In still another aspect, the invention can be grasped as a computer program that causes a computer to execute the series of signal processing steps of each of the data transmitting method and the data receiving method.

In that case, the computer program for data transmission is a program for executing the following series of processing:

processing for deciding quality of an environment of a communication path;

processing for adding, when it is decided that the environment of the communication path is defective, redundant bits to respective bits of main data to produce hybrid bit data, and adding, when it is decided that the environment of the communication path is non-defective, respective bits of associated data associated with the main data to the respective bits of the main data instead of the redundant bits to produce the hybrid bit data; and processing for producing a modulated wave signal on the basis of the data produced to transmit the modulated wave signal.

The computer program for data reception is a computer program for executing the following series of processing:

processing for demodulating a signal received;

processing for applying, at every Nyquist interval, symbol decision to the signal demodulated to produce a symbol value;

processing for converting the symbol value produced by the symbol decision into a bit value;

processing for combining respective bit data of the main data to recovery original main data from data of the bit value converted; and processing for combining bits added to the respective bits of the main data to form combined data from data of the bit value converted, deciding validity of the combined data formed, recoverying data decided as valid as additional data, deleting the added bits when it is decided that the combined data is invalid, and combining the bit data from which the added bits are deleted to recovery original data.

According to the invention, operational effects are obtained in that it is possible to efficiently perform transmission and reception of associated data associated with main data and it is possible to easily control presence or absence of error correction.

BEST MODE FOR CARRYING OUT THE INVENTION

A transmitting apparatus and receiving apparatus according to an embodiment of the invention will be hereinafter specifically explained with reference to the drawings.

Figure 1:
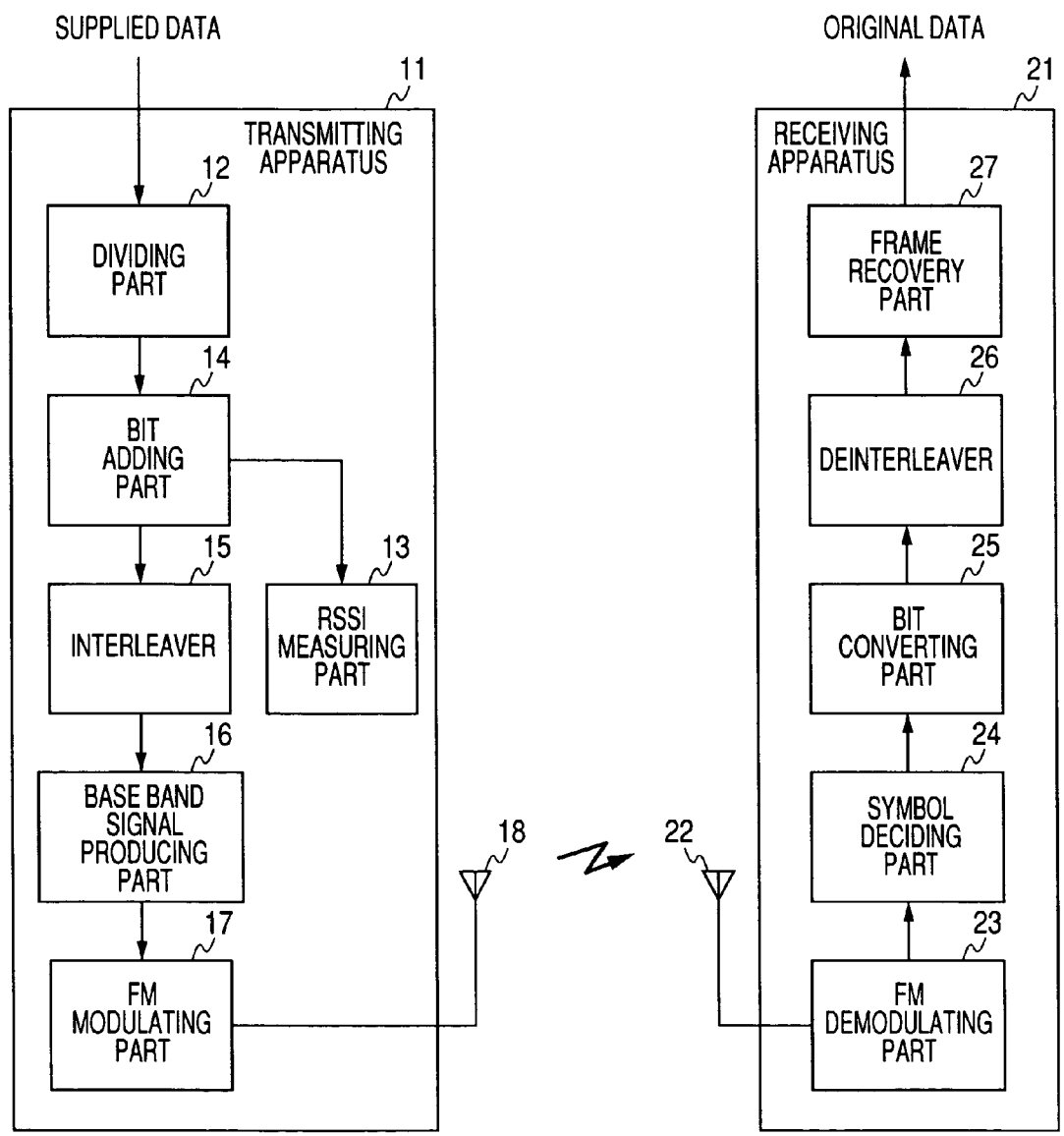
FIG. 1 is a block diagram showing a constitution of a transmitting apparatus and receiving apparatus according to an embodiment of the invention.

A constitution of the transmitting apparatus and receiving apparatus according to this embodiment is shown in FIG. 1.

The transmitting apparatus and receiving apparatus according to this embodiment includes a transmitting apparatus 11 and a receiving apparatus 21.

The transmitting apparatus 11 transmits a signal modulated in accordance with data supplied and includes a dividing part 12, an RSSI measuring part 13, a bit adding part 14, an interleaver 15, a base band signal producing part 16, an FM modulating part 17, and a transmission antenna 18.

In this embodiment, a case in which an audio vocoder is transmitted in accordance with a quaternary root Nyquist FSK system will be explained as an example.

Figure 2:
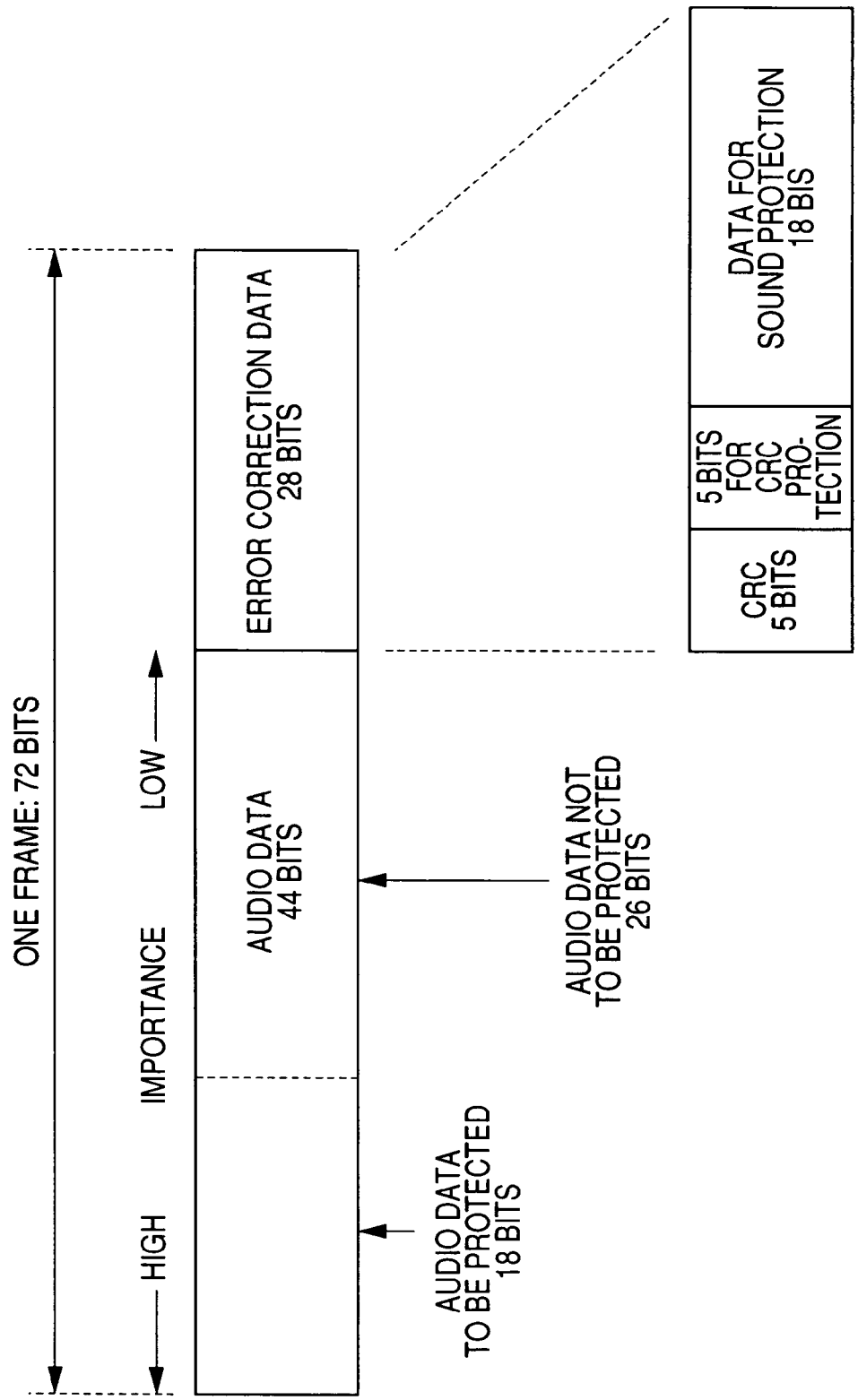
FIG. 2 is an explanatory diagram showing a constitution of a data frame of an audio vocoder.

The audio vocoder is a system for representing an audio signal in a digital form and is a system for analyzing and extracting a set of parameters of sounds and resynthesizing the sounds from the parameters. As shown in FIG. 2, data of the audio vocoder, is formed as a frame and processed with information of the data sectioned in temporal parts.

The data of the audio vocoder is formed as a frame with 20 msec as a part. A data frame of the audio vocoder includes audio data and error correction data. The number of bits of one frame is set to 72 bits (3600 bps). The audio data is data indicating audio information. The error correction data is data for error correction and error detection for the audio data.

The error correction data includes 5-bit CRC (Cyclic Redundancy Check) data, 5-bit CRC protection data, and 18-bit sound protection data.

The number of bits of the audio data is set to 44 bits in one frame. The number of bits of the error correction bit is set to 28 bits.

Respective bit data of the audio data are rearranged in order from one with highest importance for the human sense of hearing. Among the bit data, audio data to be protected is formed as 18-bit audio data and audio data not to be protected is formed as 26-bit audio data.

The audio data to be protected is data with high importance that should be protected even under an environment in which a lot of errors tend to occur and a communication state is not satisfactory. For example, in communication such as a voice call, a sound includes a large number of elements that can be captured by the human perception. It is important to make it possible to recognize what kinds of words are uttered even if noise is superimposed on the sound.

It is important to find how to protect such bit data with high importance. In this embodiment, such bit data with high importance is protected with a simple constitution.

Referring back to FIG. 1, the dividing part 12 is supplied with the data of the audio vocoder shown in FIG. 2 and divides the data supplied bit by bit. The bits considered to have high importance as described above are calculated in advance according to verification, simulation, or the like of an algorism of the vocoder as described above. Bits of the data of the audio vocoder are arranged in order from one with highest importance.

The RSSI measuring part 13 measures a Received Signal Strength Indicator (hereinafter, "RSSI") for deciding quality of an environment of a communication path. It is assumed that the transmitting apparatus 11 and the receiving apparatus 21 in this embodiment perform data transmission and reception in full duplex (the full duplex communication system). In the case of full duplex, the transmitting apparatus 11 can predict a reception environment of the receiving apparatus 21 according to an RSSI of a radio wave received.

The bit adding part 14 adds "1" or bits of additional data to bits with high importance among respective bit data divided by the dividing part 12 to produce 2-bit data (e.g., a gray code).

The bit adding part 14 acquires an RSSI from the RSSI measuring part 13, decides a level of the received signal strength indicator, and decides quality of an environment of a communication path by comparing the RSSI acquired with threshold values set in advance. The bit adding part 14 sets bits to be added in accordance with the level of the received signal strength indicator.

When the bit adding part 14 decides that the received signal strength indicator is low, the bit adding part 14 adds redundant bit data to respective bit data of audio data to be protected to produce encoded hybrid bit data. When the bit adding part 14 decides that the received signal strength indicator is high, the bit adding part 14 adds respective bit data of additional data to the respective bit data of the audio data to be protected instead of the redundant bit data to produce hybrid bit data.

The additional data are data obtained by unitizing additional information for expansion of services such as guidance data concerning telephone numbers, location information of an originator, and a profile of the originator and is data associated with the audio data to be protected.

As described above, in the case of the data of the audio vocoder, the audio data to be protected is 18-bit data. If 5 bits of the CRC data is included, the audio data is 23-bit data. Therefore, the bit adding part 14 produces 23-bit additional data in order to associate the additional data with the 23-bit data.

Figure 3:
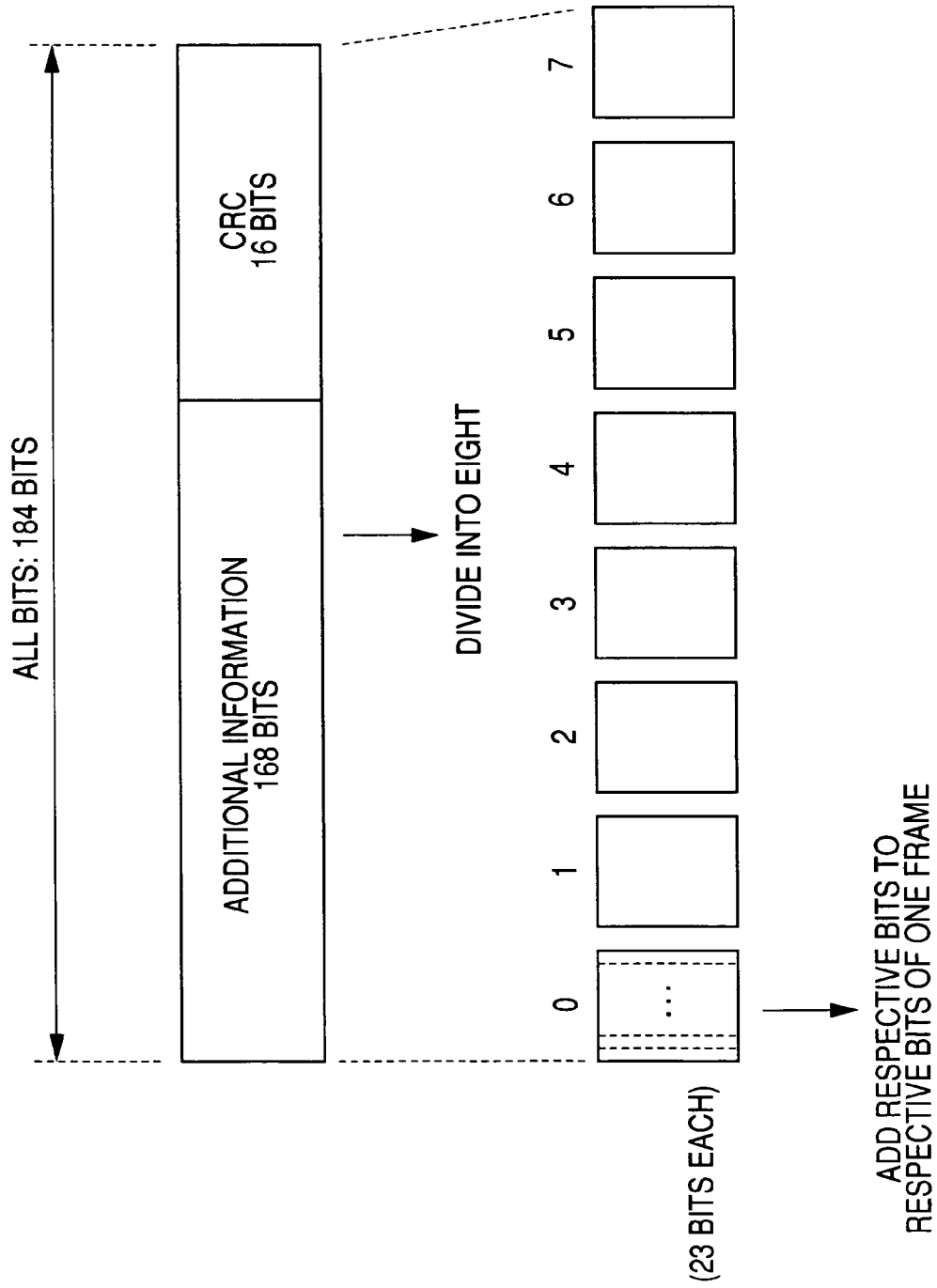
FIG. 3 is an explanatory diagram showing a constitution of additional data.

As shown in FIG. 3, when it is assumed that additional information is 168-bit data and CRC is 16-bit data, the total number of bits of the additional information including 16 bits of the CRC is 184 bits. Therefore, when the dividing part 12 divides the additional information including the CRC to produce 23-bit additional data, a total number of additional data is eight.

In the case of the data of the audio vocoder, when it is assumed that CRC data is 16-bit data and one frame is 20 msec, it is possible to perform data transmission at 1150 bps.

Figure 4:
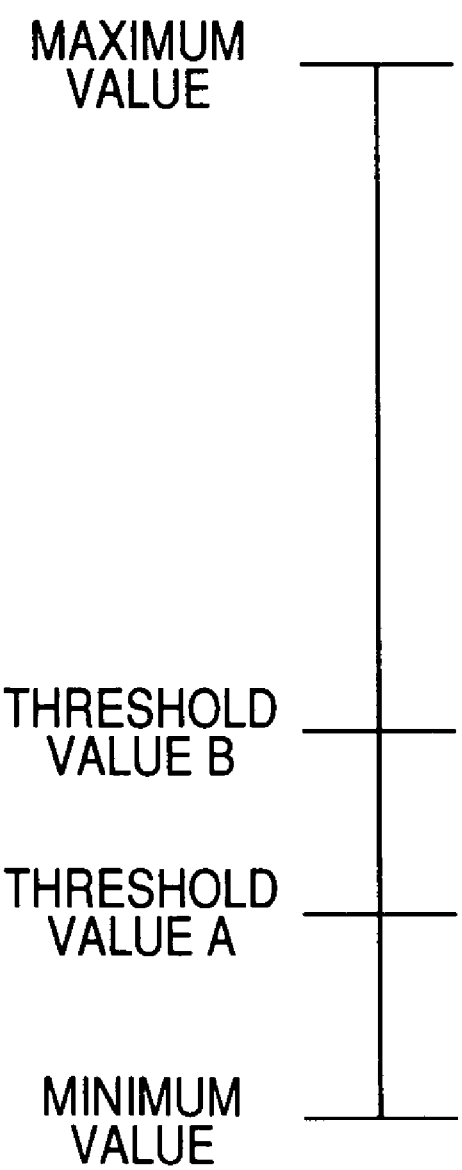
FIG. 4 is an explanatory diagram showing threshold values for a bit adding part in FIG. 1 to decide a level of an RSSI.

As shown in FIG. 4, the bit adding part 14 sets two threshold values A and B for comparing with an RSSI measured. The threshold value A is a threshold value for determining a level of an RSSI. If the RSSI measured is lower than the threshold value A, the bit adding part 14 decides that the RSSI is low and sets "1" in data added to bits with high importance divided by the dividing part 12. If the RSSI is equal to or higher than the threshold value A, the bit adding part 14 decides that the RSSI is high and sets respective bits of additional data in the respective bits with high importance divided by the dividing part 12.

The threshold value B is a threshold value for causing the bit adding part 14 to operate stably. Even if an RSSI measured falls to be lower than the threshold value A and, then, exceeds the threshold value A from a low level, as long as the RSSI is lower than the threshold value B, the bit adding part 14 continues an operation that the bit adding part 14 is presently executing. The bit adding part 14 includes a storing part (not shown) for storing these two threshold values A and B.

The interleaver 15 performs, with the 2-bit data produced by the bit adding part 14 as a part, interleaving between bits of audio data to be protected and bits of audio data not to be protected. The interleaver 15 produces a data sequence for reducing block errors due to phasing or the like by distributing an arrangement of important bits and CRC on a frame.

The base band signal producing part 16 produces a base band signal on the basis of the data sequence with data interleaved by the interleaver 15.

The FM modulating part 17 modulates a carrier wave using the base band signal produced by the base band signal producing part 16 in accordance with the quaternary root Nyquist FSK system. The FM modulating part 17 includes a root cosine filter. The FM modulating part 17 produces a signal forming an eye pattern shown in FIG. 5 from the base band signal produced by the base band signal producing part 16. The transmission antenna 18 transmits the signal subjected to FM modulation by the FM modulating part 17 as a radio wave.

The receiving apparatus 21 includes a reception antenna 22, an FM demodulating part 23, a symbol deciding part 24, a bit converting part 25, a deinterleaver 26, and a frame recovery part 27.

The reception antenna 22 receives a radio wave transmitted from the transmitting apparatus 11 and converts the radio wave into a signal based on the FSK system.

The FM demodulating part 23 performs FM demodulation and produces a detection signal by converting the signal of the FSK system converted by the reception antenna 22 into a voltage signal with a voltage based on the frequency.

Figure 5:
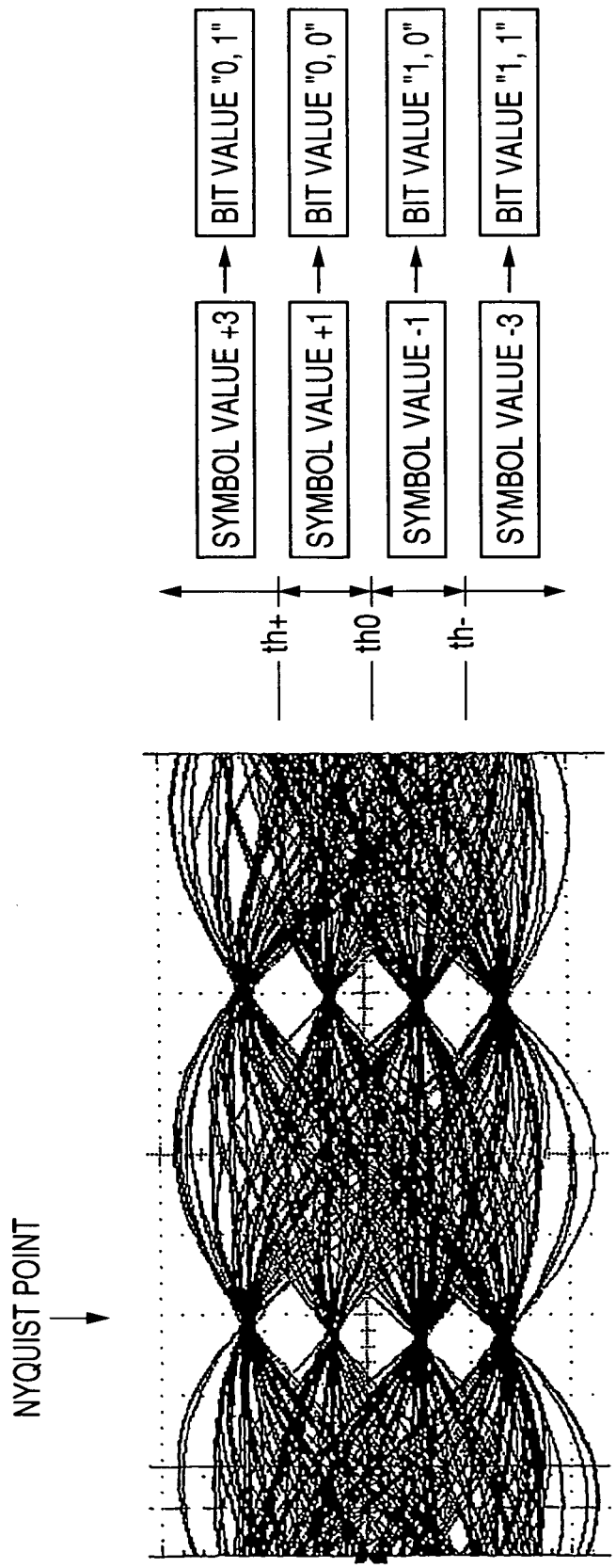
FIG. 5 is an explanatory diagram showing an eye pattern and details of symbol decision in the case in which a quaternary Nyquist FSK is used.

The symbol deciding part 24 performs symbol decision at a Nyquist point of the detection signal produced by the FM demodulating part 23. An eye pattern shown in FIG. 5 is drawn according to the detection signal produced by the FM demodulating part 23. According to the quaternary FSK system, three openings are observed in this eye pattern at the maximum.

With a point of the openings as a Nyquist point, three threshold values th+, th0, and th− for performing symbol decision are set in advance. The symbol deciding part 24 performs symbol decision by comparing the three threshold values th+, th0, and th− at the Nyquist point with a voltage of the detection signal.

The symbol deciding part 24 decides that a symbol value is +3 when a voltage of the detection signal at the Nyquist point exceeds the threshold value th+. The symbol deciding part 24 decides that a symbol value is +1 when a voltage of the detection signal at the Nyquist point is equal to or higher than the threshold value th0 and equal to or lower than the threshold value th+. The symbol deciding part 24 decides that a symbol value is −1 when a voltage of the detection signal at the Nyquist point is lower than the threshold value th0 and equal to or higher than the threshold value th−. The symbol deciding part 24 decides that a symbol value is −3 when a voltage of the detection signal at the Nyquist point is lower than the threshold value th−.

The bit converting part 25 converts the symbol value decided by the symbol deciding part 24 into bits of a bit value based on the symbol value. As shown in FIG. 5, when the symbol value decided by the symbol deciding part 24 is +3, the bit converting part 25 converts the symbol value +3 into a bit value "0, 1". When the symbol value is +1, the bit converting part 25 converts the symbol value +1 into a bit value "0, 0". When the symbol value is −1, the bit converting part 25 converts the symbol value −1 into a bit value "1, 0". When the symbol value is −3, the bit converting part 25 converts the symbol value −3 into a bit value "1, 1". An array of the bits subjected to bit conversion by the bit converting part 25 is a gray code.

The deinterleaver 26 deinterleaves the data subjected to bit conversion by the bit converting part 25 in two bit parts.

The frame recovery part 27 produces an original data frame from the data deinterleaved by the deinterleaver 26.

The frame recovery part 27 combines bit data added to respective higher order bits with high importance among the data deinterleaved by the deinterleaver 26 to recovery 23-bit audio data to be protected.

The frame recovery part 27 combines, assuming that respective bit data of audio data to be protected are as higher order bit data, lower order bit data added to the higher order bit data to produce a 23-bit data part. The frame recovery part 27 includes buffers. The frame recovery part 27 stores eight 23-bit data parts in the buffers such that the number of the data parts corresponds to the total number of additional data.

The frame recovery part 27 decides, on the basis of presence or absence of an error of CRC, whether the eight data parts stored in the buffers are valid or invalid. When it is decided that the data parts stored are valid, the frame recovery part 27 combines, assuming that data of the respective data parts are additional data, eight additional data to recovery the additional information shown in FIG. 3.

The frame recovery part 27 does not treat the additional data as valid data when the CRC indicates an error because of a communication error. However, it is possible to efficiently collect valid data by increasing the number of bufferings and performing maximum likelihood decision.

On the other hand, when it is decided that the data parts stored are invalid, the frame recovery part 27 deletes, assuming that the bits added as redundant bits, the redundant bits.

Operations of the transmitting apparatus and receiving apparatus according to this embodiment will be explained.

Figure 6:
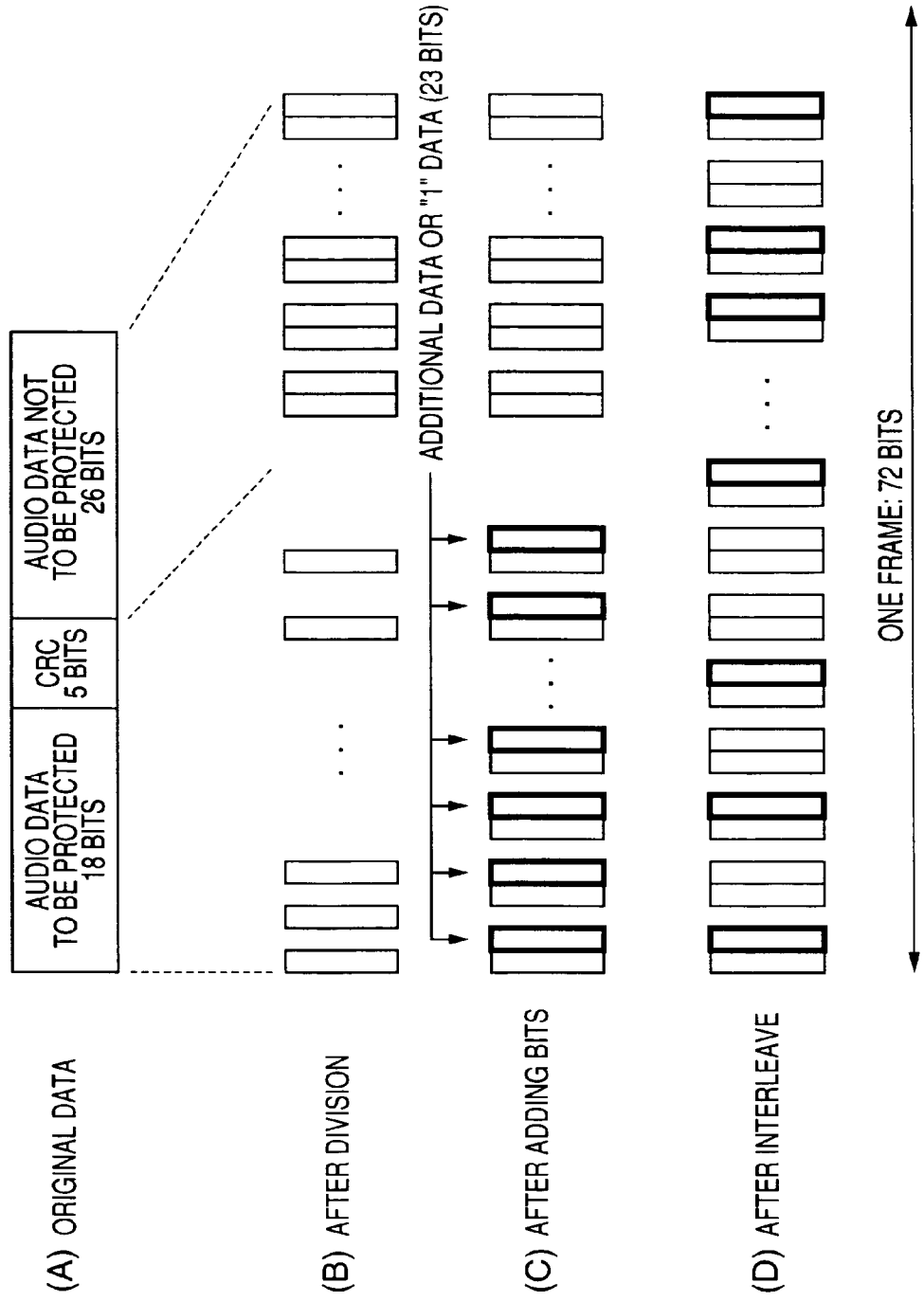
FIG. 6 is an explanatory diagram showing operations of the transmitting apparatus shown in FIG. 1.

The dividing part 12 of the transmitting apparatus 11 divides, bit by bit, audio data to be protected including 5 bits of CRC among data of an audio vocoder supplied shown in FIG. 6(a) to produce bit data each having one bit shown in FIG. 6(b). The dividing part 12 divides audio data not to be protected into bit data each having two bits.

The RSSI measuring part 13 measures an RSSI between the transmitting apparatus 11 and the receiving apparatus 21.

Figure 7:
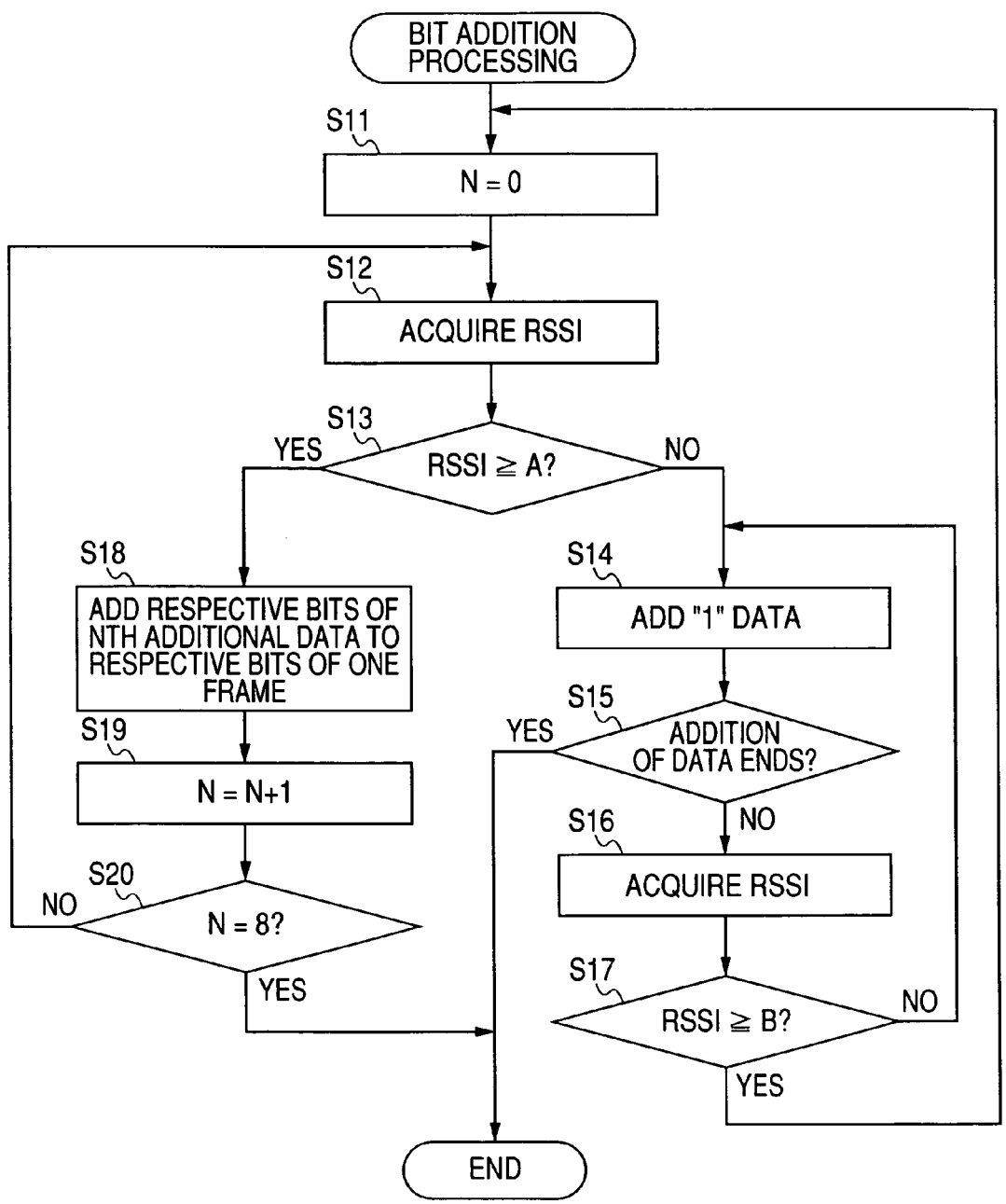
FIG. 7 is a flowchart showing details of bit addition processing executed by the bit adding part shown in FIG. 1.

The bit adding part 14 divides additional information supplied into eight to provide eight 23-bit additional data. The bit adding part 14 executes bit addition processing in accordance with a flowchart shown in FIG. 7.

The bit adding part 14 sets 0 in a block number n of additional data to initialize the block number n (step S11).

The bit adding part 14 acquires an RSSI measured by the RSSI measuring part 13 (step S12).

The bit adding part 14 decides whether the RSSI acquired is equal to or higher than the threshold value A (step S13).

When it is decided that the received signal strength indicator is lower than the threshold value A (No in step S13), the bit adding part 14 sets a bit value to be added to respective divided bit data obtained of audio data to be protected to "1". The bit adding part 14 adds the bits with the bit value "1" set to the divided respective bit data of the audio data to be protected including 5 bits of CRC to produce 2-bit data (step S14).

The bit adding part 14 decides whether the addition of the data of "1" to the data for one frame has ended (step S15).

When it is decided that the addition of the data of "1" has ended (Yes in step S15), the bit adding part 14 ends this bit addition processing.

When it is decided that the addition of the data of "1" has not ended (No in step S15), the bit adding part 14 acquires the RSSI measured by the RSSI measuring part 13 (step S16).

The bit adding part 14 decides whether the RSSI acquired is equal to or higher than the threshold value B (step S17).

When it is decided that the RSSI acquired is smaller than the threshold value B (No in step S17), even if the RSSI is equal to or larger than the threshold value A, the bit adding part 14 adds the bit with the bit value "1" set to the divided respective bit data of the audio data to be protected (step S14).

When it is decided that the RSSI acquired is equal to or larger than the threshold B (Yes in step S17), the bit adding part 14 sets 0 in the value n and acquires the RSSI measured by the RSSI measuring part 13 (steps S11 and S12).

When it is decided that the RSSI of the radio wave received is equal to or larger than the threshold value A (Yes in step S13), the bit adding part 14 adds respective bit data of nth additional data including 5 bits of CRC to the respective bit data of one frame obtained by dividing the audio data to be protected (step S18).

The bit adding part 14 increments n (step S19).

The bit adding part 14 decides whether n has reached 8 (step S20).

When it is decided that n has not reached 8 (No in step S20), the bit adding part 14 acquires an RSSI again and sequentially adds additional data to the respective bit data obtained by dividing the audio data to be protected as long as the RSSI acquired is not less than the threshold value A (steps S12 to S19).

When it is decided that n has reached 8 (Yes in step S20), the bit adding part 14 ends this processing.

In this way, the bit adding part 14 adds "1" or bits of additional data to bits with high importance among the respective bit data divided by the dividing part 12 to produce 2-bit data shown in FIG. 6(c).

The interleaver 15 performs, with the two bits of the data produced by the bit adding part 14 as a part, interleaving between a pair formed by the bit added with the bit data and the bit of the audio data to be protected and the two bits of the audio data not to be protected to produce a data sequence shown in FIG. 6(d).

The base band signal producing part 16 produces a base band signal on the basis of the data sequence subjected to the interleaving of bits by the interleaver 15.

The FM modulating part 17 modulates a carrier wave using the base band signal produced by the base band signal producing part 16 in accordance with the quaternary root Nyquist FSK system. The transmission antenna 18 transmits a signal subjected to FM modulation by the FM modulating part 17 as a radio wave.

The reception antenna 22 of the receiving apparatus 21 receives the radio wave transmitted from the transmitting apparatus 11 and converts the radio wave into a signal based on the FSK system. The FM demodulating part 23 converts the FSK signal converted by the reception antenna 22 into a voltage signal with a voltage based on a frequency of the FSK signal to produce a detection signal.

The symbol deciding part 24 compares a voltage at a Nyquist point of the detection signal produced by the FM demodulating part 23 with the three threshold values th+, th0, and th− set in advance to perform symbol decision.

The bit converting part 25 converts a symbol decided by the symbol deciding part 24 into a bit with a bit value based on a value of the symbol.

Figure 8:
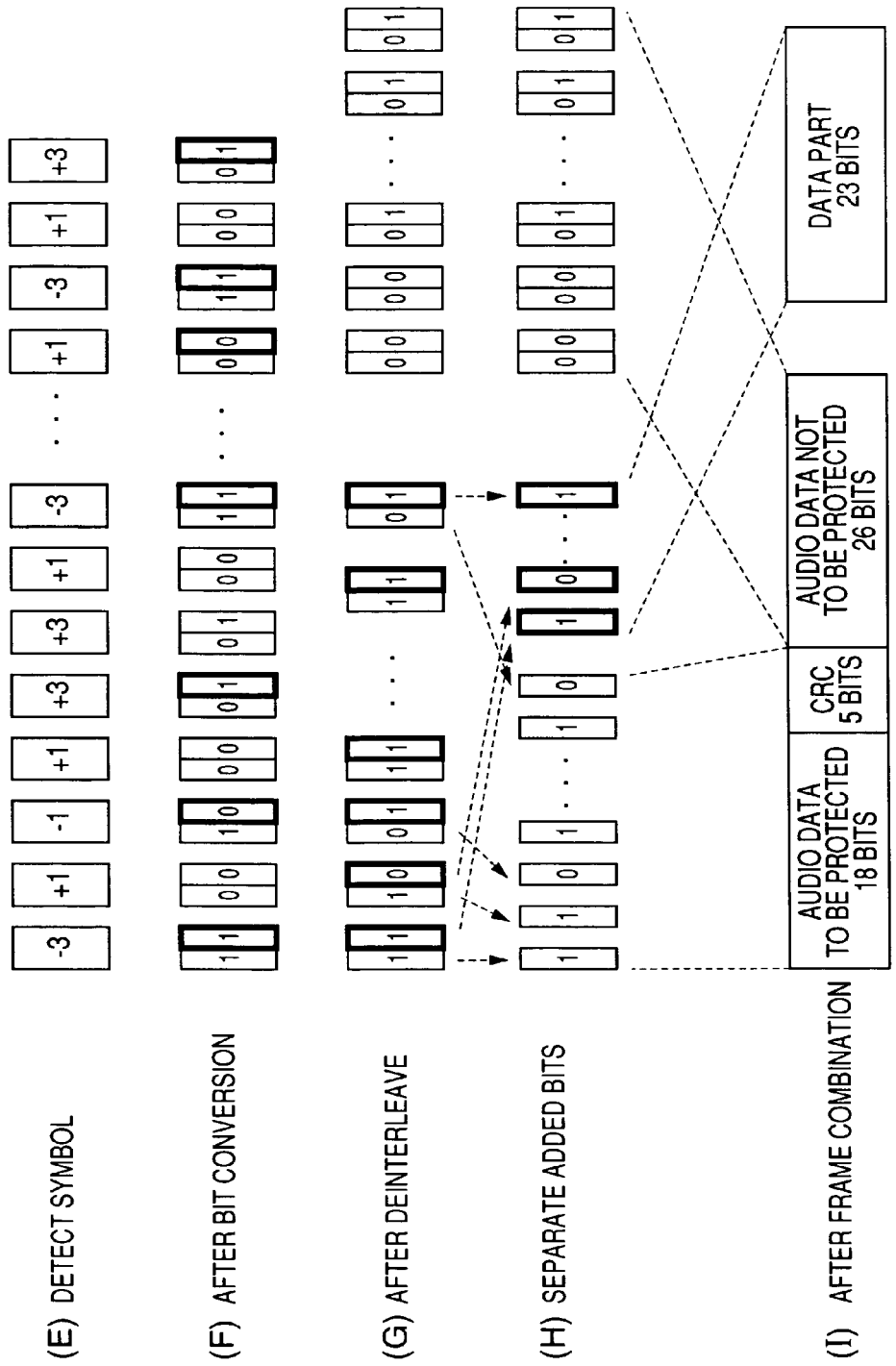
FIG. 8 is an explanatory diagram showing operations of the receiving apparatus shown in FIG. 1.

As shown in FIG. 8(e), if a symbol value obtained as a result of the decision by the symbol deciding part 24 is −3, as shown in FIG. 8(f), the bit converting part 25 converts the symbol value into a bit value "1, 1". Similarly, the bit converting part 25 performs bit conversion in accordance with a symbol decision value. A bit array of data subjected to bit conversion is an array of a gray code.

As shown in FIG. 8(g), the deinterleaver 26 deinterleaves bits of the data subjected to bit conversion by the bit converting part 25 to be a data array of the pair of the bit added with the redundant bit data and the bit of the audio data to be protected and two bits of the audio data not to be protected.

As shown in FIG. 8(h), the frame recovery part 27 separates the data with two bits each deinterleaved by the deinterleaver 26 bit by bit. The frame recovery part 27 combines bit data of the audio data to be protected among the bit data separated as higher order bits and recoverys the 5-bit CRC and the 18-bit protected audio data.

Figure 9:
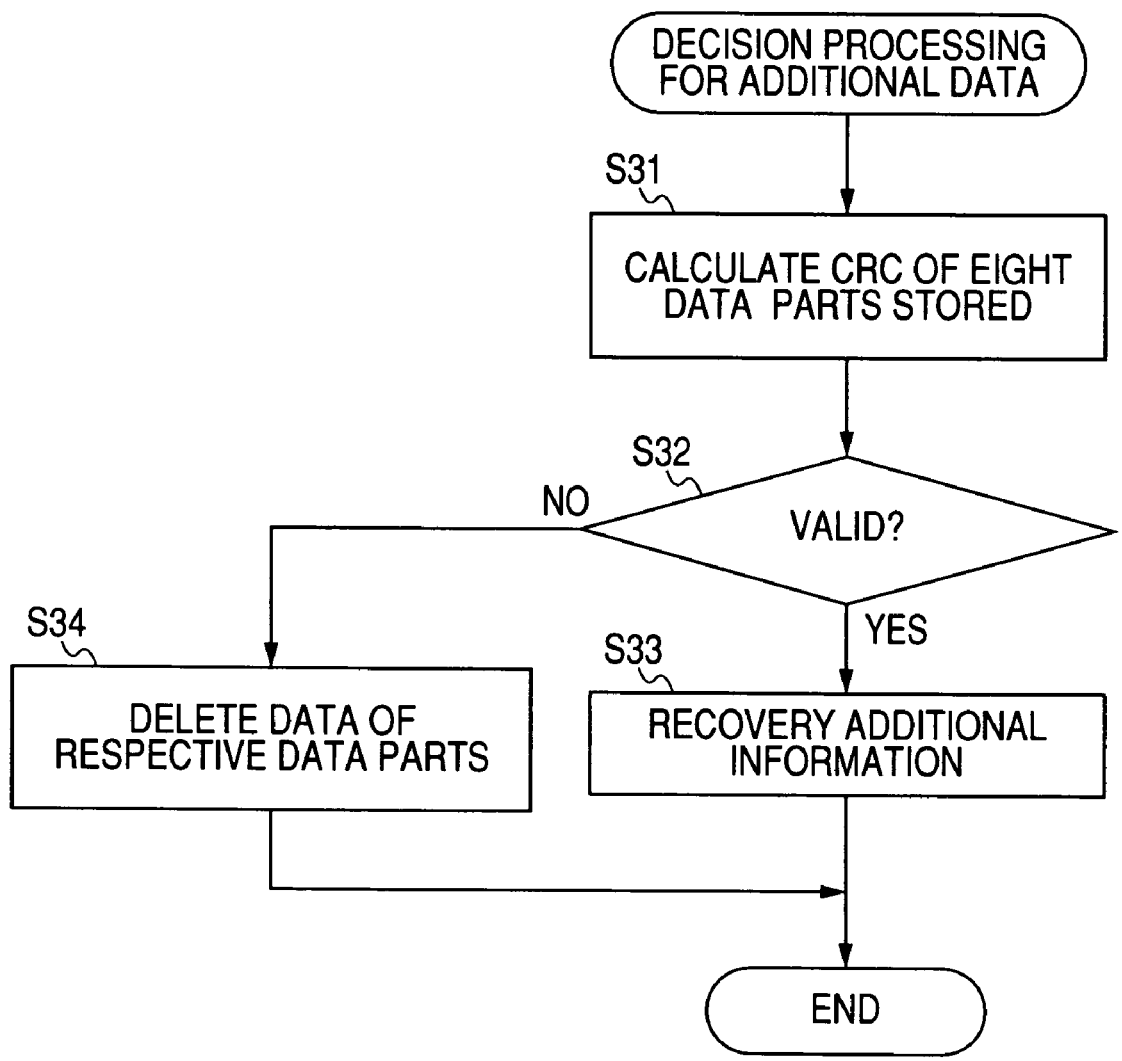
FIG. 9 is a flowchart showing details of decision processing for additional data executed by a frame recovery part shown in FIG. 1.

The frame recovery part 27 combines lower order bits added to the higher order bits among the bit data separated to produce 23-bit data part shown in FIG. 8(i). The frame recovery part 27 stores this data part in the buffers in an order of supply. When the data part is stored in the eight buffers, the frame recovery part 27 performs decision processing for additional data in accordance with a flowchart shown in FIG. 9.

The frame recovery part 27 calculates CRC of the eight data part stored (step S31).

The frame recovery part 27 decides whether the eight data parts are valid or invalid on the basis of the CRC calculated (step S32).

When no error occurs in the CRC calculated, the frame recovery part 27 decides that the eight data parts are valid (Yes in step S32). In this case, the frame recovery part 27 decides that the eight data parts are additional data obtained by dividing the additional information shown in FIG. 3 into eight, respectively. The frame recovery part 27 combines the eight additional data to recovery the additional information (step S33).

When an error occurs in the CRC calculated, the frame recovery part 27 decides that the eight data parts are invalid (No in step S32). In this case, the frame recovery part 27 deletes data of the respective data part (step S34). The frame recovery part 27 executes such decision processing and ends this processing.

Figure 10:
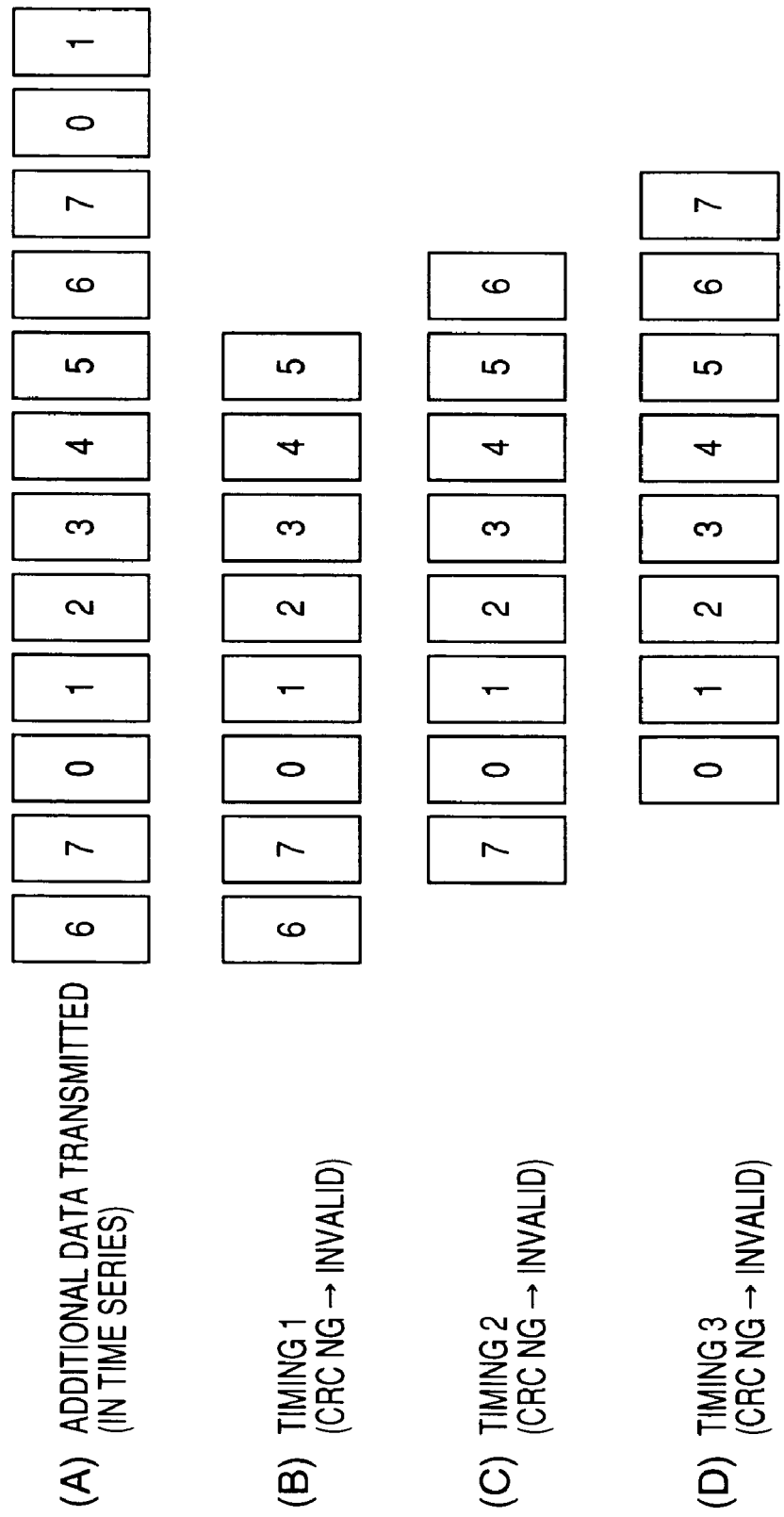
FIG. 10 is an explanatory diagram showing specific details of decision processing for additional data executed by the frame recovery part.

Details of the decision processing for data by this frame recovery part 27 will be specifically explained on the basis of FIG. 10. It is assumed that respective blocks of FIGS. 10(a) to 10(d) indicates 23-bit additional data, numerical values in the respective blocks are part numbers of the additional data, and the data parts of the part numbers 0 to 7 form one piece of additional information.

When the plural additional data shown in FIG. 10(a) are supplied to the frame recovery part 27, as shown in FIG. 10(b), the frame recovery part 27 stores the data parts of the part numbers 6, 7, and 0 to 5 in the buffers at timing 1.

The frame recovery part 27 calculates CRC of the data parts of the part numbers 6, 7, and 0 to 5 stored in the buffers.

In this case, the CRC indicates an error. When the CRC indicates an error, the frame recovery part 27 decides that the data parts of the part numbers 6, 7, and 0 to 5 are invalid (No in step S32) and deletes data of these data parts (processing in step S34).

As shown in FIG. 10(c), the frame recovery part 27 stores the data parts of the part numbers 7 and 0 to 6 in the buffers at timing 2. Since CRC of the data part of the part numbers 7 and 0 to 6 stored indicates an error, as in the case shown in FIG. 10(b), the frame recovery part 27 decides that the data parts of the part numbers 7 and 0 to 6 are invalid and deletes data of these data parts (processing in step S34).

As shown in FIG. 10(d), the frame recovery part 27 stores the data parts of the part numbers 0 to 7 in the buffers at timing 3. If an error has not occurred in the respective bit data, an error does not occur in CRC of the data parts of the part numbers 0 to 7 stored. Therefore, the frame recovery part 27 decides that the data parts of the part numbers 0 to 7 are valid (Yes in step S32). When the frame recovery part 27 decides that the data parts of the part numbers 0 to 7 are valid, the frame recovery part 27 combines the eight additional data to recovery the 168-bit additional information shown in FIG. 3 (processing in step S33).

When attention is paid only to the bit data to be protected, as a result, the transmitting apparatus 11 performs binary modulation rather than quaternary modulation. If lower order bits are redundant bits, the receiving apparatus 21 only deletes the lower order bits. As a result, processing performed by the receiving apparatus 21 is equivalent to binary demodulation.

Therefore, although intervals among the respective symbols at the time of four values are "2", according to such constitution in this embodiment, the symbol intervals are changed to "6" that is three times as large as the symbol intervals "2". Logically, a BER is improved by about 4.8 dB.

As described above, the transmitting apparatus 11 adds redundant bits in the quaternary FSK system and the receiving apparatus 21 deletes the redundant bits added by the transmitting apparatus 11. As a result, although the processing is equivalent to the binary FSK system in terms of characteristics, the modulation system is still the quaternary FSK system.

As explained above, according to this embodiment, the transmitting apparatus 11 decides a reception environment and determines whether an error correction data should be transmitted or additional data should be transmitted. The receiving apparatus 21 decides whether the additional data are valid or invalid. When it is decided that the additional data are valid, the receiving apparatus 21 combines the additional data to recovery additional information.

Therefore, since the transmitting apparatus 11 only adds bit data of the additional data instead of redundant bit data, the transmitting apparatus 11 can transmit the additional data with a simple method. The receiving apparatus 21 is not required to switch a communication procedure at all according to whether the transmitting apparatus 11 transmits the additional data or transmits the error correction data. The receiving apparatus 21 can easily control presence or absence of error correction. For example, even when data for error correction is transmitted, since a gain is already secured and the additional data is simply invalidated, it is possible to adopt an identical communication procedure.

Consequently, even if the receiving apparatus 21 is not applicable to additional data, the receiving apparatus 21 can recovery the additional data. Thus, compatibility is maintained regardless of whether this embodiment is applied or not applied.

It is possible to transmit and receive additional data without depending on handshake and without using a special protocol. The receiving apparatus 21 can execute an error correction procedure with a simple constitution regardless of presence or absence of additional data.

When the transmitting apparatus 11 decides that a reception environment is bad, the transmitting apparatus 11 adds redundant bits to respective data bits of an audio vocoder. The receiving apparatus 21 performs FM demodulation and, then, performs symbol decision to delete the redundant bits added by the transmitting apparatus 11.

Therefore, even under an environment in which a communication state is not satisfactory, it is possible to more surely perform error correction. In particular, the transmitting apparatus and receiving apparatus in this embodiment is suitable for phone calls and transmission of sounds and images in streaming.

When the transmitting apparatus 11 decides that the communication environment is bad, the transmitting apparatus 11 adds redundant bits to data. The receiving apparatus 21 deletes the redundant bits of the data demodulated. Therefore, it is possible to perform error correction by performing such simple processing. Consequently, compared with a transmitting apparatus and receiving apparatus of the FEC system that performs a lot of arithmetic operations and a transmitting apparatus and receiving apparatus that uses a Viterbi decoder or the like that requires a large memory capacity, since the arithmetic operations for error correction and a memory capacity are not required, it is possible to simplify a constitution of the transmitting apparatus and receiving apparatus in this embodiment. Since it is unnecessary to actuate a processor at high speed, it is possible to realize low power consumption.

In embodying the invention, various forms are conceivable. The invention is not limited to the embodiment described above.

For example, in the embodiment, the case in which voice call is performed using the quaternary root Nyquist FSK is explained. However, data to be processed is not limited to audio data and may be data of images. The FSK is not limited to four values and may be multi values equal to or larger than four values. A modulation system is not limited to the FSK and other modulation systems such as PSK may be used.

In this embodiment, the RSSI measuring part is provided in order to decide quality of an environment of a communication path. However, a constitution for deciding quality of an environment of a communication path is not limited to such a constitution.

Figure 11:
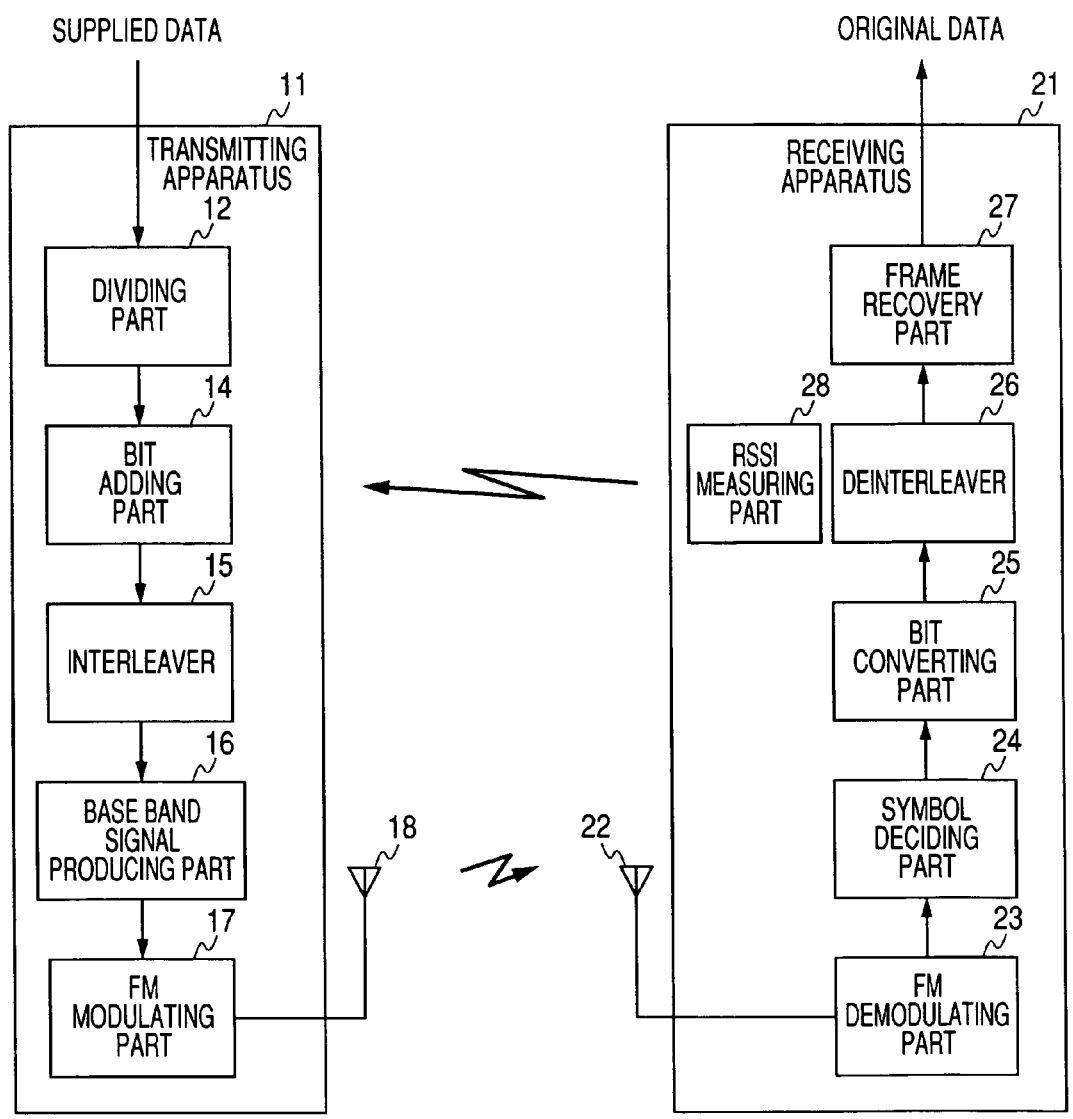
FIG. 11 is a block diagram showing an example of an application for deciding quality of an environment of a communication path.

For example, as shown in FIG. 11, it is also possible that the receiving apparatus 21 includes an RSSI measuring part 28 and the RSSI measuring part 28 measures an RSSI and transmits the RSSI measured to the transmitting apparatus 11.

It is also possible that the receiving apparatus 21 transmits not only the RSSI but also information such as an EVM (Error Vector Magnitude) and a BER (Bit Error Rate) to the transmitting apparatus 11 and the transmitting apparatus 11 decides quality of an environment of a communication path on the basis of these pieces of information.

In performing data transmission and reception in full duplex, it is more practical that the receiving apparatus 21 transmits information for deciding quality of an environment of a communication path to the transmitting apparatus 11.

In this embodiment, the examples for which bit importance is defined such as phone calls and streaming are explained. However, this embodiment is also sufficiently applicable to protocol and mail communication when it is desired to easily increase a gain. It is also possible to apply this embodiment not only to additional data transmission during voice calls but also to additional data transmission other than that in telephone calls.

In this embodiment, the case in which 21-byte (168-bit) additional data are transmitted as one part is explained as an example. However, there are various data lengths of additional data and additional data do not have to be the 21-byte additional data. When additional data with 21 bytes or more are transmitted, a data structure only has to be contrived to make it possible to assemble plural parts on the receiving apparatus 21 side.

In this embodiment, the audio vocoder is explained as an example. However, it is possible to apply this embodiment not only to the audio vocoder but also to data communication. In this case, data for which protection is desired to be partially reinforced and other data only have to be applied to the data to be protected and the data not to be protected in this embodiment.

In data used for data communication and the like, the number of bits may change every time communication content changes. For example, as in the case in which "FF" and "FE" are flags indicating transmission and reception, respectively, even a least significant bit has the same importance as higher order bits. Even in such a case, for example, when it is possible to add a 3-bit control flag to the end of data and make only the three bits resistant to an error to define importance, this embodiment is extremely effective.

In this embodiment, a direct communication system between the transmitting apparatus 11 and the receiving apparatus 21 in which a base station is not interposed is explained. However, this embodiment is also applicable to a system in which a base station is interposed such as a cellular phone simply by replacing a transmission and reception object of direct communication with the base station. This embodiment is applicable not only to a full duplex operation but also to a simplex operation.

In this embodiment, the bit adding part 14 adds the redundant bit data to respective bits of supplied data such that a gray code is produced. However, the invention is not limited to the embodiment as long as the bit adding part 14 arranges symbols added with the redundant bit data such that a Euclidian distance of hybrid bit data obtained by adding the redundant bit data is extended.

This embodiment can be executed by software. In this case, the transmitting apparatus 11 and the receiving apparatus 12 include processors for executing the software. Even when this embodiment is executed by the software, since it is unnecessary to perform arithmetic operations in the FEC, a program is simplified. Thus, it is possible to reduce a memory capacity required for the program.

It is also possible that a program for causing a computer to operate as an entire reproducing apparatus or a part of the reproducing apparatus or execute the processing described above is stored in a computer readable recording medium such as a flexible disk, a CD-ROM (Compact Disk Read-Only Memory), or a DVD (Digital Versatile Disk) and distributed and the program is installed in the computer to cause the computer to operate as the means described above or execute the process described above. Alternatively, it is also possible that the program is stored in a disk device or the like included in a server apparatus on the Internet and superimposed on, for example, a carrier wave to be downloaded to the computer.

INDUSTRIAL APPLICABILITY

The transmitting apparatus and receiving apparatus and the transmitting and receiving method for data according to the invention can be suitably used in a radio communication system, for example, a mobile communication terminal or a base station.

The invention claimed is:

1. A transmitting apparatus for 4-value FSK modulation for transmitting data using four symbol values, the transmitting apparatus comprising:
a dividing part supplied with original data arranged in order from one with highest importance, which comprises first data and second data after the first data and for dividing the first data, the first data being protected and having a predetermined number of higher order bits, the second data not being protected into first bit data in a unit of one bit and the second data into second bit data in a unit of two bits;
a communication path quality decision part for deciding quality of an environment in a communication path;
a bit adding part configured to add to each of the first bit data as a higher bit a redundant bit or an additional data bit associated with the original data to be transmitted, the redundant bit being predetermined so that the first bit data added with the redundant bit corresponds to any one of specific two symbol values, an interval between the specific two symbol values being largest of the four symbol values, to create encoded data in a unit of two bits, and to encode the second bit data in a unit of the divided two bits, wherein if it is decided by the communication path quality decision part that the quality of the communication environment is low, the redundant bit is added to the first bit data, while if it is decided that the quality is high, the additional bit data is added to the first bit data to create the encoded data; and
a modulating part for performing modulation on the basis of the created encoded data to create and output a modulated signal.

2. The transmitting apparatus according to claim 1, wherein the bit adding part operates to add the redundant bit data to each of the bits of the first bit data such that a gray code is produced.

3. The transmitting apparatus according to any one of claims 1 or 2, the communication path quality decision part comprising a received signal strength indicator measuring part that measures a received signal strength indicator of a data transmission destination, wherein the bit adding part operates to acquire the received signal strength indicator from the received signal strength indicator measuring part and decide quality of an environment in the communication path on the basis of a level of the received signal strength indicator acquired.

4. The transmitting apparatus according to any one of claims 1 or 2, wherein the bit adding part operates to acquire at least one piece of information among a received signal strength indicator measured by a data transmission destination, a vector error of a demodulated wave, and a bit error and decide quality of an environment of the communication path on the basis of the information acquired.

5. A receiving apparatus that receives a 4-value FSK modulated signal created by performing modulation on the basis of encoded data created in such a way of supplying original data arranged in order from one with highest importance, which comprises first data and second data after the first data, the first data being protected and having a predetermined number of higher order bits, the second data not being protected, dividing the first data into first bit data in a unit of one bit and the second data into second bit data in a unit of two bits, adding to each of the first bit data as a higher bit a redundant bit or an additional data bit associated with the original data to be transmitted, the redundant bit being predetermined so that the first bit data added with the redundant bit corresponds to any one of specific two symbol values, an interval between the specific two symbol values being largest of the four symbol values, to create encoded data in a unit of two bits, and encoding the second bit data in a unit of the divided two bits, the receiving apparatus comprising:
a demodulating part for demodulating the received modulated signal;
a symbol deciding part for applying, at every Nyquist, symbol decision to the signal demodulated by the demodulating part;
a bit converting part for converting a symbol value obtained by applying the symbol decision by the symbol deciding part to a bit value having a predetermined number of bits; and
a frame recovering part for combining the bit data added to the first bit data from the bit value to form combined data, for deciding validity of the formed combined data based on whether a CRC error exists or not, and for recovering the combined data if it is decided to be valid, while deleting the combined data if it is decided to be invalid.

6. The receiving apparatus according to claim 5, wherein the frame recovering part operates to decide validity of the combined data formed by combining the added bit data in accordance with a cyclic redundancy check.

7. A method for transmitting data using four symbol values for 4-value FSK modulation, the method comprising the steps of:
receiving original data arranged in order from one with highest importance, which comprises first data and second data after the first data and dividing the first data into first bit data, the first data being protected and having a predetermined number of higher order bits, the second data not being protected and dividing the first data into first bit data in a unit of one bit and the second data into second bit data in a unit of two bits;
deciding quality of an environment in a communication path;
adding to each of the first bit data as a higher bit a redundant bit or an additional data bit associated with the original data to be transmitted, the redundant bit being predetermined so that the first bit data added with the redundant bit corresponds to any one of specific two symbol values, an interval between the specific two symbol values being largest of the four symbol values, to create encoded data in a unit of two bits, and to encode the second bit data in a unit of the divided two bits, wherein if it is decided in the communication path quality deciding step that the quality of the communication environment is low, the redundant bit is added to the first bit data, while if it is decided that the quality is high, the additional bit data is added to the first bit data to create the encoded data; and
performing modulation on the basis of the created encoded data to create and output a modulated signal.

8. A data receiving method for receiving a 4-value FSK modulated signal created by performing modulation on the basis of encoded data created in such a way of supplying original data arranged in order from one with highest importance, which comprises first data and second data after the first data, the first data being protected and having a predetermined number of higher order bits, the second data not being protected and dividing the first data into first bit data in a unit of one bit and the second data into second bit data in a unit of two bits and adding to each of the first bit data as a higher bit a redundant bit or an additional data bit associated with the original data to be transmitted, the redundant bit being predetermined so that the first bit data added with the redundant bit corresponds to any one of specific two symbol values, an interval between the specific two symbol values being largest of the four symbol values, to create encoded data in a unit of two bits, and encode the second bit data in a unit of the divided two bits, the receiving method comprising the steps of:

demodulating the received modulated signal;

applying, at every Nyquist, symbol decision to the signal demodulated in the demodulating step;

converting a symbol value obtained by applying the symbol decision in the symbol deciding step to a bit value having a predetermined number of bits; and combining the bit data added to the first bit data from the bit value to form combined data, for deciding validity of the formed combined data based on whether a CRC error exists or not, and recovering the combined data if it is decided to be valid, while deleting the combined data if it is decided to be invalid.

9. A computer program product stored in a non-transitory computer readable medium causing a computer to execute the processing steps of:

receiving original data arranged in order from one with highest importance, which comprises first data and second data after the first data and dividing the first data into first bit data, the first data being protected and having a predetermined number of higher order bits, the second data not being protected and dividing the first data into first bit data in a unit of one bit and the second data into second bit data in a unit of two bits;

deciding quality of an environment in a communication path;

adding to each of the first bit data as a higher bit a redundant bit or an additional data bit associated with the original data to be transmitted, the redundant bit being predetermined so that the first bit data added with the redundant bit corresponds to any one of specific two symbol values, an interval between the specific two symbol values being largest of the four symbol values, to create encoded data in a unit of two bits, and to encode the second bit data in a unit of the divided two bits, wherein if it is decided in the communication path quality deciding step that the quality of the communication environment is low, the redundant bit is added to the first bit data, while if it is decided that the quality is high, the additional bit data is added to the first bit data to create the encoded data; and performing modulation on the basis of the created encoded data to create and output a modulated signal.

10. A computer program product stored in a non-transitory computer readable medium causing a computer to execute a method for receiving a 4-value FSK modulated signal created by performing modulation on the basis of encoded data created in such a way of supplying original data arranged in order from one with highest importance, which comprises first data and second data after the first data, the first data being protected and having a predetermined number of higher order bits, the second data not being protected, dividing the first data into first bit data in a unit of one bit and the second data into second bit data in a unit of two bits and adding to each of the first bit data as a higher bit a redundant bit or an additional data bit associated with the original data to be transmitted, the redundant bit being predetermined so that the first bit data added with the redundant bit corresponds to any one of specific two symbol values, an interval between the specific two symbol values being largest of the four symbol values, to create encoded data in a unit of two bits, and encode the second bit data in a unit of the divided two bits, the receiving method comprising the steps of:

demodulating the received modulated signal;

applying, at every Nyquist, symbol decision to the signal demodulated in the demodulating step;

converting a symbol value obtained by applying the symbol decision in the symbol deciding step to a bit value having a predetermined number of bits; and combining the bit data added to the first bit data from the bit value to form combined data, for deciding validity of the formed combined data based on whether a CRC error exists or not, and recovering the combined data if it is decided to be valid, while deleting the combined data if it is decided to be invalid.

\* \* \* \* \*